United States Patent Office 3,405,140
Patented Oct. 8, 1968

3,405,140
17 - (LOWER ALIPHATIC MONO - UNSATURATED HYDROCARBON) - 17β - HYDROXY - 2 - OXAESTRA - 4,9(10) - DIEN - 3 - ONES, 11 - DEHYDRO COMPOUNDS CORRESPONDING AND ESTERS THEREOF
Raphael Pappo, Skokie, and Christopher J. Jung, Morton Grove, Ill., assignors to G. D. Searle & Co., Chicago, Ill., a corporation of Delaware
No Drawing. Continuation-in-part of application Ser. No. 479,318, Aug. 12, 1965. This application July 18, 1966, Ser. No. 565,707
9 Claims. (Cl. 260—343.2)

ABSTRACT OF THE DISCLOSURE 17-(lower aliphatic mono-unsaturated hydrocarbon)-17β-hydroxy-2-oxaestra-4,9(10)-dien-3-ones, 11-dehydro compounds corresponding and esters thereof preparable by utilizing as starting materials the corresponding $\Delta^{5(10)}$ compounds and useful in view of their hormonal properties, e.g., progestational, anabolic and androgenic. Thus, the $\Delta^{5(10)}$ compounds are contacted with bromine in the presence of a suitable organic base to produce the corresponding $\Delta^{4,9(10)}$ dienes. The $\Delta^{4,9(10),11}$ compounds are produced by an acid or base catalyzed rearrangement of said dienes to the corresponding $\Delta^{5(10),9(11)}$ compounds followed by treatment with a peroxidizing agent, cleavage of the produced epoxy compounds and dehydration of the hydroxy intermediates prepared thereby.

---

This application is a continuation-in-part of our copending application Ser. No. 479,318, filed Aug. 12, 1965, now abandoned.

The present invention is concerned with novel dienoic and trienoic lactones characterized by an unsaturated hydrocarbon substituent at the 17 position and, more particularly, with 17-(lower aliphatic mono-unsaturated hydrocarbon)-17β-hydroxy-2-oxaestra - 4,9(10)-dien-3-ones, the 11-dehydro compounds corresponding and the esters thereof which are represented by the following structural formula

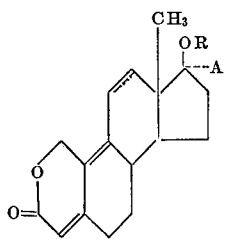

wherein R is hydrogen or a lower alkanoyl radical, A is a lower aliphatic mono-unsaturated hydrocarbon radical and the dotted line indicates an optional 11, 12 double bond.

The lower aliphatic mono-unsaturated hydrocarbon radicals depicted in the foregoing structural representation are typified by vinyl, ethynyl, propynyl, butynyl, pentynyl, hexynyl, heptynyl, allyl, crotyl, butenyl, pentenyl, hexenyl, heptenyl, propargyl, methylpropargyl, and the branched-chain radicals isomeric therewith, i.e., those radicals represented by the following formulas $$C_nH_{2n-1}$$

and $$C_nH_{2n-3}$$

wherein $n$ is a positive integer less than 8.

The compounds of the following formula

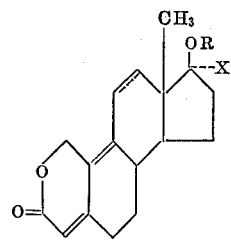

wherein R is hydrogen or a lower alkanoyl radical, X represents a lower aliphatic mono-unsaturated hydrocarbon radical having the unsaturated linkage adjacent to the point of attachment at the 17 position and the dotted line indicates an optional 11, 12 double bond, constitute one preferred embodiment of this invention. Specific examples of the radicals contemplated are ethynyl, vinyl, 1-propynyl, 1-propenyl, 1-heptynyl, 1-heptenyl, i.e., those of the following formula

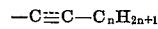

$$-C{\equiv}C-C_nH_{2n+1}$$

wherein $n$ is a positive integer less than 6 and the dotted line indicates that the unsaturated linkage is alternatively doubly or triply bonded.

Suitable starting materials for the manufacture of the instant compounds are the 17-substituted 2-oxaestr-5(10)-en-3-ones described in U.S. Patent 3,246,014. When those $\Delta^{5(10)}$ compounds are contacted with bromine in the presence of a suitable organic base, there are produced the corresponding $\Delta^{4,9(10)}$ substances. As a specific example, 17α-ethynyl-17β-hydroxy - 2 - oxaestr-5(10)-en-3-one in pyridine is contacted with a carbon tetrachloride solution of bromine at room temperature to yield 17α-ethynyl-17β-hydroxy-2-oxaestra-4,9(10)-dien-3-one.

The instant $\Delta^{4,9(10),11}$ compounds are conveniently produced by a process involving, as the first step, rearrangement of the 4(5) and 9(10) double bonds of the aforementioned dienes to the 5(10) and 9(11) positions, respectively. That rearrangement is effected under the influence of either an acidic or an alkaline catalyst. As a specific example, 17α-ethynyl-17β-hydroxy-2-oxaestra-4, 9(10)-dien-3-one in methanol is contacted with aqueous sodium hydroxide to yield 17α-ethynyl-17β-hydroxy-2-oxaestra-5(10),9(11)-dien-3-one. Reaction of those 5(10), 9(11)-dienes with a peroxidizing agent such as an organic peracid results in a mixture of the corresponding 9α,11α-epoxide and 5β,10β-epoxide. When 17α-ethynyl-17β-hydroxy-2-oxaestra-5(10),9(11)-dien-3-one is allowed to react with m-chloroperbenzoic acid in methylene chloride, there is obtained a mixture of 9α,11α-epoxy-17α-ethynyl-17β-hydroxy-2-oxaestr-5(10)-en-3-one and 5β,10β-epoxy-17α-ethynyl-17β-hydroxy-2-oxaestr-9(11)-en-3-one. When those epoxides are cleaved, typically by heating with a suitable organic amine, the corresponding 11α-hydroxy-4,9(10)-diene and 10β-hydroxy-4,9(11)-diene are obtained. A mixture of 9α,11α-epoxy-17α-ethynyl-17β-hydroxy-2-oxaestr-5(10)-en-3-one and 5β,10β-epoxy-17α-ethynyl-17β-hydroxy-2-oxaestr-9(11)-en-3-one dissolved in pyridine is heated with triethylamine to afford a mixture of 17α-ethynyl-11α,17β-dihydroxy - 2 - oxaestra - 4,9(10)-dien-3-one and 17α-ethynyl-10β,17β-dihydroxy-2-oxaestra-4,9(11)-dien-3-one. Dehydration of either the 10β-hydroxy or 11α-hydroxy intermediate or a mixture thereof is effected by heating with a suitable acid catalyst. The latter mixture in benzene is thus heated with p-toluenesulfonic acid to yield 17α-ethynyl-17β-hydroxy-2-oxaestra-4,9(10),11-trien-3-one and 17α-ethynyl-17β-hydroxy-2-oxaestra-1(10),4,9(11)-trien-3-one.

The instant 17α-alkenyl compounds are alternatively produced by partial reduction of the corresponding 17α-alkynyl substances. That process is specifically illustrated by the hydrogenation at atmospheric pressure and room temperature, utilizing a 5% palladium-on-carbon catalyst, of 17α - ethynyl - 17β - hydroxy - 2 - oxaestra-4,9(10)-dien - 3 - one to yield 17β - hydroxy - 2 - oxa-17α-vinyl-estra-4,9(10)-dien-3-one.

The reaction of the instant 17-hydroxy compounds with a lower alkanoic acid anhydride or halide, preferably in the presence of a suitable acid acceptor, produces the corresponding 17-(lower alkanoates). The aforementioned 17α - ethynyl - 17β - hydroxy - 2 - oxaestra - 4,9(10)-dien-3-one is thus heated with acetic anhydride and pyridine to afford 17β - acetoxy - 17α-ethynyl-2-oxaestra-4,9(10)-dien-3-one.

The compounds of the present invention exhibit valuable pharmacological properties. They are hormonal agents, for example, as is evidenced by their progestational activity. Thus, they possess the ability to effect proliferation of the uterine epithelium. They exhibit also anabolic and androgenic activity.

The following examples describe in detail certain of the compounds illustrative of the present invention and methods which have been devised for their manufacture. The invention, however, is not to be construed as limited thereby either in spirit or in scope since it will be apparent to those skilled in the art that many modifications both in materials and methods may be practiced without departing from the purpose and intent of the disclosure. In the examples hereinafter detailed, temperatures are given in degrees centigrade (° C.) and quantities of materials in parts by weight except as otherwise noted.

Example 1

To a solution of one part of 17α - ethynyl - 17β-hydroxy-2-oxaestr-5(10)-en-3-one in 30 parts of pyridine is added, at room temperature over a period of about 3 minutes, 6.72 parts by volume of a carbon tetrachloride solution containing 0.59 part of bromine. The reaction mixture is allowed to stand at room temperature overnight, then is concentrated to a small volume by distillation at room temperature under reduced pressure. The residual mixture is diluted with water, then is extracted with benzene. The benzene layer is separated, then is washed successively with dilute hydrochloric acid, water, dilute aqueous sodium hydroxide and water. Drying over anhydrous sodium sulfate followed by removal of the solvent under reduced pressure affords the crude product as a solid residue. Purification of that material by recrystallization from benzene results in 17α - ethynyl - 17β - hydroxy - 2 - oxaestra - 4, 9(10)-dien-3-one, which melts at about 191–196°. This compound can be represented by the following structural formula

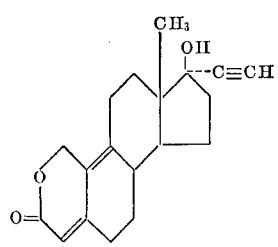

Example 2

To a solution of 3 parts of 17α - ethynyl - 17β - hydroxy-2-oxaestra-4,9(10)-dien-3-one in 150 parts of pyridine is added 0.3 part of 5% palladium-on-carbon catalyst, and the resulting mixture is shaken with hydrogen at atmospheric pressure and room temperature until one molecular equivalent of hydrogen has been absorbed. The catalyst is removed by filtration, and the filtrate is stripped of solvent by distillation under reduced pressure to afford the crude residue. That material is triturated with benzene, then is dissolved in benzene, and that solution is stirred with aluminum silicate in order to remove suspended particles and color. The clarified and decolorized organic solution is partially concentrated, and the crystals which form are collected by filtration and dried to afford 17β - hydroxy - 2-oxa - 17α - vinylestra - 4,9(10) - dien-3-one, melting at about 194–198° and characterized by the following structural formula

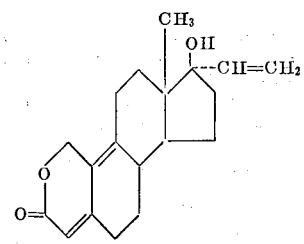

Example 3

A mixture of one part of 17α - ethynyl - 17β - hydroxy-2 - oxaestra - 4,9(10) - dien - 3 one, 10 parts of acetic anhydride and 20 parts of pyridine is heated at 90–100° for about 4 hours, then is cooled and poured carefully into a mixture of ice and water. The resulting aqueous solution is extracted with benzene, and the benzene layer is separated, washed with water, dried over anhydrous sodium sulfate and concentrated to dryness under reduced pressure, thus affording 17β - acetoxy - 17α - ethynyl - 2 - oxaestra - 4,9 (10)-dien-3-one of the following structural formula

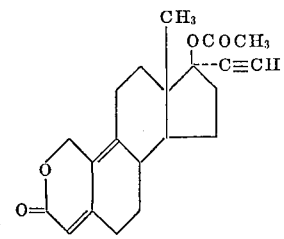

Example 4

The substitution of an equivalent quantity of 17β-hydroxy - 17α - propynyl - 2 - oxaestr - 5(10)-en-3-one in the procedure of Example 1 results in 17β - hydroxy - 2-oxa-17α-propynylestra-4,9(10)-dien-3-one.

Example 5

When equivalent quantities of 17β-hydroxy-2-oxa-17α-propynylestra-4,9(10)-dien-3-one and propionic anhydride are allowed to react according to the procedure of Example 3, there is obtained 2 - oxa - 17β - propionoxy - 17α-propynylestra-4,9(10)-dien-3-one.

Example 6

The substitution of an equivalent quantity of 17β-hydroxy - 2 - oxa - 17α - propynylestra - 4,9(10) - dien-3-one in the procedure of Example 2 results in 17β - hydroxy-2-oxa-17α-propenylestra-4,9(10)-dien-3-one.

Example 7

To a solution of 9.5 parts of 17α-ethynyl-17β-hydroxy-2-oxaestra-4,9(10)-dien-3-one in 60 parts of methanol is added 6.4 parts by volume of a 50% aqueous sodium hydroxide solution and the resulting reaction mixture is stored at room temperature in a nitrogen atmosphere for about 16 hours. At the end of that time, water is added, and the organic solvent is removed by distillation under reduced pressure. The pH is adjusted to approximately 8 by the addition of dilute hydrochloric acid and solid carbon dioxide. That aqueous mixture is washed with chloroform, then is acidified with hydrochloric acid. The acidic solution is extracted with chloroform, and the organic layer is separated, washed successively with dilute aqueous potassium bicarbonate and water, then dried over anhydrous sodium sulfate and stripped of solvent under reduced pressure. The resulting residue is purified by recrystallization from benzene to yield 17α-ethynyl-17β-hydroxy-2-oxaestra-5(10),9(11)-dien-3-one, melting at about 162.5–164.5°.

Example 8

To a solution of 8.35 parts of 17α-ethynyl-17β-hydroxy-2-oxaestra-5(10),9(11)-dien-3-one in 200 parts of methylene chloride is added, at about 0°, 6.04 parts of m-chloroperbenzoic acid. The reaction mixture is stored at approximately 0° for about 60 hours, then is diluted with cold benzene and filtered. The filtrate is washed successively with cold dilute potassium bicarbonate and water, then dried over anhydrous sodium sulfate and stripped of solvent by distillation under reduced pressure. Crystallization of the resulting residue from ethyl acetate-benzene yields a mixture of 9α,11α-epoxy-17α-ethynyl-17β-hydroxy - 2 - oxaestr-5(10)-en-3-one and 5β,10β-epoxy-17α-ethynyl-17β-hydroxy-2-oxaestr-9(11)-en-3-one, melting at about 203–210°.

Example 9

To a solution of 3 parts of the mixture of 9α,11α-epoxy-17α - ethynyl - 17β-hydroxy-2-oxaestr-5(10)-en-3-one and 5β,10β - epoxy-17α-ethynyl-17β-hydroxy-2-oxaestr-9(11)-en-3-one, obtained by the procedure described in Example 8, in 30 parts of pyridine is added 43.8 parts of triethylamine, and that reaction mixture is heated at the reflux temperature under nitrogen for about 40 minutes. Removal of the solvent by distillation under reduced pressure affords a residue which is partitioned between water and chloroform. The organic layer is separated, washed successively with dilute hydrochloric acid, dilute aqueous potassium carbonate and water, then dried over anhydrous sodium sulfate and stripped of solvent under reduced pressure. Purification of the resulting residue by recrystallization from ethyl acetate affords a mixture of 17α-ethynyl - 11α,17β - dihydroxy-2-oxaestra-4,9(10)-dien-3- and and 17α - ethynyl - 10β,17β - dihydroxy-2-oxaestra-4,9(11)-dien-3-one, melting at about 194–199°.

Example 10

To a solution of 1.96 parts of the mixture of 17α-ethynyl - 11α,17β - dihydroxy - 2 - oxaestra-4,9(10-dien-3-one and 17α - ethynyl - 10β,17β - dihydroxy-2-oxaestra-4,9(11)-dien-3-one, obtained according to the procedure of Example 9, in 440 parts of benzene is added 0.45 part of p-toluenesulfonic acid. The resulting reaction mixture is slowly distilled over a period of about 25 minutes, then is cooled and diluted with cold water. The diluted solution is stirred for about 5 minutes, at the end of which time the layers are separated, and the organic layer is washed successively with sodium hydroxide and water, then dried over anhydrous sodium sulfate and stripped of solvent under reduced pressure. The resulting residue is purified by crystallization from benzene to afford 17α-ethynyl - 17β - hydroxy-2-oxaestra-1(10),4,9(11)-trien-3-one, melting at about 214.5–217.5°.

The benzene filtrates from the latter crystallization are concentrated to dryness, and the resulting residue is dissolved in 40 parts of methanol. To that solution is then added 20 parts of 5% aqueous sodium hydroxide, and the reaction mixture is stored at room temperature for about 4 hours. At the end of that time, the pH is adjusted to approximately 8 by the addition of solid carbon dioxide, and that mixture is extracted with chloroform. The chloroform solution is washed successively with aqueous potassium carbonate and water, then dried and stripped of solvent under reduced pressure to afford 17α-ethynyl-17β-hydroxy-2-oxaestra-4,9(10),11-trien-3-one, characterized by the following structural formula

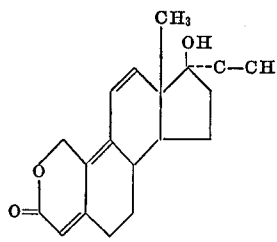

An additional quantity of 17α-ethynyl-17β-hydroxy-2-oxaestra-4,9(10),11-trien-3-one is isolated from the latter alkaline aqueous solution by acidification with acetic acid followed by extraction with chloroform, washing of the chloroform solution successively with aqueous potassium carbonate and water, drying over anhydrous sodium sulfate and removal of the solvent by distillation under reduced pressure.

Example 11

To a solution of 3 parts of 17α-ethynyl-17β-hydroxy-2-oxaestra-5(10),9(11)-dien-3-one in 150 parts of pyridine is added 0.3 part of 5% palladium-on-carbon catalyst, and the resulting mixture is shaken with hydrogen at atmospheric pressure and room temperature until one molecular equivalent of hydrogen has been absorbed. Removal of the catalyst by filtration affords a filtrate, which is evaporated to dryness under reduced pressure. The resulting residue is dissolved in benzene, and that solution is clarified and decolorized by stirring with aluminum silicate. Partial concentration of the benzene solution results in crystallization of the product which is isolated by filtration and dried to afford, as the benzene solvate, 17β-hydroxy-2-oxa - 17α - vinylestra-5(10),9(11)-dien-3-one, melting at about 82–89°.

Example 12

By substituting an equivalent quantity of 17α-ethynyl-17β-hydroxy-2-oxaestra-4,9(10),11-trien-3-one and otherwise proceeding according to the processes of Example 2, there is obtained 17β-hydroxy-2-oxa-17α-vinylestra-4,9(10),11-trien-3-one.

Example 13

The substitution of an equivalent quantity of 17β-hydroxy-2-oxa-17α-propynylestra-4,9(10)-dien-3-one in the hydroxy - 2 - oxa - 17α - propynylestra-4,9(10),11-trien-3-successive procedures of Examples 7–10 results in 17β-one and 17β - hydroxy-2-oxa-17α-propynylestra-1(10),4,9 (11)-trien-3-one.

Example 14

By substituting an equivalent quantity of 17β-hydroxy-2 - oxa - 17α - propynylestra-4,9(10),11-trien-3-one and otherwise proceeding according to the processes described in Example 3, there is produced 17β-acetoxy-2-oxa-17α-propynylestra-4,9(10),11-trien-3-one.

Example 15

The substitution of an equivalent quantity of 17β-hydroxy-2-oxa - 17α - propynylestra-4,9(10),11-trien-3-one in the procedure of Example 2 results in 17β-hydroxy-2-oxa-17α-propenylestra-4,9(10),11-trien-3-one.

What is claimed is:
1. A compound of the formula

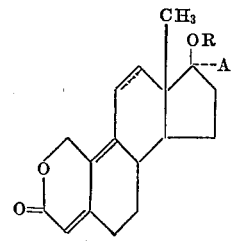

wherein A is a lower mono-unsaturated aliphatic hydrocarbon radical, R is selected from the group consisting of hydrogen and a radical of the formula

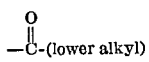
—C-(lower alkyl)

and the dotted line indicates the optional presence of an 11,12 double bond.

2. As in claim 1, a compound of the formula

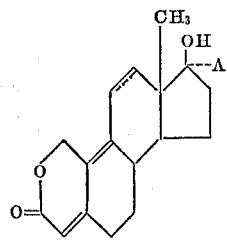

where A is a lower mono-unsaturated aliphatic hydrocarbon radical and the dotted line indicates the optional presence of an 11,12 double bond.

3. As in claim 1, a compound of the formula

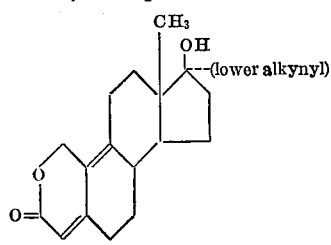

4. As in claim 1, a compound of the formula

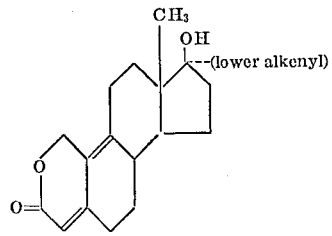

5. As in claim 1, the compound which is 17α-ethynyl-17β-hydroxy-2-oxaestra-4,9(10)-dien-3-one.

6. As in claim 1, the compound which is 17β-hydroxy-2-oxa-17α-vinylestra-4,9(10)-dien-3-one.

7. As in claim 1, the compound which is 17β-acetoxy-17α-ethynyl-2-oxaestra-4,9(10)-dien-3-one.

8. As in claim 1, the compound which is 17α-ethynyl-17β-hydroxy-2-oxaestra-4,9(10),11-trien-3-one.

9. As in claim 1, the compound which is 17β-hydroxy-17α-vinyl-2-oxaestra-4,9(10),11-trien-3-one.

References Cited

UNITED STATES PATENTS 3,246,014   4/1966   Jung et al. _____ 260—343.2

JAMES A. PATTEN, *Primary Examiner.*